(12) United States Patent
Coward et al.

(10) Patent No.: US 7,982,656 B2
(45) Date of Patent: Jul. 19, 2011

(54) IMAGING APPARATUS AND METHOD (75) Inventors: Peter R Coward, Malvern (GB); Neil A Salmon, Malvern (GB)

(73) Assignee: QinetiQ Limited, London (GB)

( * ) Notice: Subject to any disclaimer, the term of this patent is extended or adjusted under 35 U.S.C. 154(b) by 1079 days.

(21) Appl. No.: 10/592,679

(22) PCT Filed: Mar. 29, 2005

(86) PCT No.: PCT/GB2005/001220
§ 371 (c)(1),
(2), (4) Date: Sep. 13, 2006

(87) PCT Pub. No.: WO2005/093463
PCT Pub. Date: Oct. 6, 2005

(65) Prior Publication Data
US 2007/0188370 A1    Aug. 16, 2007

(30) Foreign Application Priority Data

Mar. 26, 2004   (GB) .................................. 0406778.1

(51) Int. Cl.
*G01S 13/89* (2006.01)
(52) U.S. Cl. .............................. 342/22; 342/27; 342/179
(58) Field of Classification Search .................... 342/22, 342/179, 27
See application file for complete search history.

(56) References Cited

U.S. PATENT DOCUMENTS

| | | | |
|---|---|---|---|
| 5,073,782 A | 12/1991 | Huguenin et al. | |
| 5,227,800 A | 7/1993 | Huguenin et al. | |
| 5,541,558 A | 7/1996 | Weber et al. | |
| 5,557,283 A | 9/1996 | Sheen et al. | |
| 5,710,430 A * | 1/1998 | Nuss ......................... | 250/358.1 |
| 6,937,182 B2 | 8/2005 | Lovberg et al. | |
| 7,194,236 B2 * | 3/2007 | Lovberg et al. ................. | 342/22 |

FOREIGN PATENT DOCUMENTS

| | | |
|---|---|---|
| WO | WO 98/32035 | 7/1998 |
| WO | WO 02/17231 | 2/2002 |
| WO | WO 03/083508 | 10/2003 |
| WO | WO 03/098741 | 11/2003 |

* cited by examiner

*Primary Examiner* — Ian J Lobo
(74) *Attorney, Agent, or Firm* — Nixon & Vanderhye P.C.

(57) ABSTRACT

A millimeter wave imaging apparatus and method capable of identifying the presence of relatively thin dielectric materials is disclosed. The method involves taking a plurality of millimeter wave images of a scene at different frequencies and analyzing the images at different frequencies to look for frequency dependent effects in the scene. Relatively thin dielectric materials can lead to interference effects which can be detected. In one embodiment the imaging apparatus comprises a millimeter wave imager (2) connected to a processor (16) and at least one variable frequency illumination source (22*a* . . . *d*, 24*a* . . . *d*). The or each illumination source sweeps the illumination frequency across a reasonably wide bandwidth and the imager captures radiation returned from the scene at a number of different illuminating frequencies.

22 Claims, 2 Drawing Sheets

IMAGING APPARATUS AND METHOD

This application is the US national phase of international application PCT/GB2005/001220, filed 29 Mar. 2005, which designated the U.S. and claims priority of GB 0406778.1, filed 26 Mar. 2004, the entire contents of each of which are hereby incorporated by reference.

BACKGROUND OF THE INVENTION

1. Field of the Invention

This invention relates to an imaging apparatus and method, especially to a millimeter wave imaging system suitable for screening applications, such as security screening, and in particular to a personnel imaging system able to image dielectric materials.

2. Discussion of Prior Art

There is a growing interest in providing effective screening equipment for security applications or contraband detection. For instance archway metal detectors are well known for access control at airports or other secure areas to detect metallic objects concealed about a person. Such detectors are good at identifying the presence of a metallic object but offer no discrimination as to what that metallic object might be and are obviously limited to the detection of metallic objects. Thus they provide no security against non metallic items such as ceramic weapons or explosives. Nor do they allow any screening for non-metallic contraband.

There has therefore been a lot of interest in developing an imaging apparatus which allows images to be collected that can used in the detection and identification of concealed items. Imaging equipment operating at millimeter wavelengths has been proposed as most clothing is largely transmissive at such wavelengths allowing more substantial items underneath to be observed.

Passive millimeter wave systems have been proposed in which millimeter wave cameras simply collect radiation from a field of view to generate an image. Metallic objects have different emissivity and reflectivity characteristic to the human body and so the intensity of radiation received from a metallic object varies to that received from the human body.

To provide greater contrast, especially in indoor situations, active systems are also known wherein the field of view is illuminated with radiation at millimeter wavelengths.

Millimeter wave imaging systems generally provide good contrast between the human body and metallic objects but are generally less good at identifying non-metallic materials, such as plastics or glass.

U.S. Pat. No. 5,073,782 discloses an active millimeter wave imaging system. Here a plurality of oscillators illuminate a scene with incoherent radiation so as to avoid speckle. Preferably the illuminating radiation is of a certain defined polarisation. In one embodiment the illuminating radiation is linearly polarised in one plane and the detector array only receives radiation linearly polarised in an orthogonal plane. Radiation directly reflected from the scene, say by metallic objects, preserves its polarisation and so is not received by the detector array. Radiation from ceramic or plastic materials undergoes multiple reflections and thus the polarisation is randomised. Thus some radiation from these objects will be received. U.S. Pat. No. 5,227,800 discloses a similar millimeter wave imaging system.

International patent application WO 03/083508 discloses an imaging system which provides improved contrast by illuminating the scene at two different illumination levels. The radiometric temperature of an object depends on the radiation it emits, transmits and reflects. Two different objects, having different characteristics may nevertheless have the same total radiometric temperature under certain conditions and will therefore be indistinguishable. WO03/083508 discloses a device which images the scene at least two different illumination levels so as to generate more information about a scene.

It is therefore an object of the present invention to provide an imaging apparatus which mitigates at least some of the above mentioned disadvantages.

SUMMARY OF THE INVENTION

Thus according to the present invention there is provided a millimeter wave imaging apparatus comprising at least one detector arranged to image a scene and a frequency selection means for providing a plurality of different predominant frequencies of radiation for detection wherein the detector output is recorded for each different predominant frequency and wherein the imaging apparatus further comprises indicator means for indicating the presence of any frequency dependent variation in the detector output.

Most millimeter wave imaging systems are intended to collect radiation reflected from an object, whether it be ambient radiation or radiation emitted from a specific illumination source, together with radiation emitted by the object and work on the principle that different objects have different characteristics leading to discernible contrast in the final image. However certain dielectric materials especially relatively thin slabs of such materials are largely transparent to millimeter wave radiation and as such are very hard to detect.

A millimeter wave imager is one operating in the millimeter waveband. The millimeter wave band is often taken to be a frequency range of approximately 20 to 140 GHz. The skilled person will appreciate however that similar imaging techniques can be used at higher frequencies and indeed the techniques of the present invention can be applied to imaging systems operating at such higher wavelengths. For the purposes of this specification the term millimeter waveband means not only a frequency range of approximately 20 to 140 GHz but includes frequencies up 300 GHz (1 mm) and higher frequencies still. The skilled person will appreciate that operating at 300 GHz say can give advantages in reduced aperture size, better resolution etc. However at higher frequencies the attenuation of materials increases and frequency dependent effects disappear.

The present invention lies in the realisation that relatively thin layers of dielectric materials can give rise to interference effects which may be detectable. For instance interference effects can alter the effective reflectivity of the material. The interference effect will depend upon the frequency of radiation used for detection and so will vary with frequency. This frequency variation can be used to detect thin dielectric objects. Also, when in the vicinity of another object thin dielectrics can modify the reflective properties of that object in a frequency dependent manner. In effect at some frequencies the dielectric material can act as an antireflection coating to the object in question reducing the reflectivity thereof.

The human body has a reflectivity co-efficient of approximately 0.3 to 0.5 in the millimeter waveband, being about 0.5 at or around 30 GHz and reducing with frequency to around 0.3 at approximately 100 GHz. However the reflectivity of the human body is largely frequency independent across a range of 10 GHz or more within the millimeter band. Metals have a reflectivity co-efficient approaching 1.0 which is largely constant across the waveband. Therefore when illuminated with millimeter wave radiation at say 30-40 GHz the reflection from the human body will be roughly half that reflected from a metallic object which will lead to good contrast in a captured image. As mentioned though a dielectric material is fairly transmissive at millimeter wavelengths and is correspondingly largely invisible in normal millimeter wave images. However when a slab of dielectric material is located adjacent the body the reflection characteristics will start to exhibit frequency dependent characteristics due to interference effects. In essence at some frequencies, which will depend upon the thickness and nature of the dielectric material, radiation reflected from the front of the dielectric will destructively interfere with that reflected from the body and the overall reflectivity of the body-dielectric combination will be reduced. At other wavelengths there may be constructive interference leading to a greater reflectivity. Therefore the reflectivity of the body-dielectric combination will exhibit a frequency response whereas the body on its own to a first order will not. The present invention therefore detects radiation from the scene at a plurality of different predominant frequencies in order to determine whether there are any frequency dependent responses. The frequency selection means ensures that a number of different predominant frequencies are recorded and the indicator means indicates any frequency variations in the detected signals.

Conveniently the apparatus has at least one illumination source having variable output frequency and the frequency selection means controls the frequency output of the at least one source. The at least one detector can then detect radiation from the scene which will periodically be illuminated with a different illuminating frequency. Measuring the returns from the scene at the different illumination frequencies allows the identification means to identify any frequency dependent variations in the scene such as arising from varying reflectivity from a dielectric layer. The detector, will of course, still receive ambient radiation from the scene, which will not vary, but the illuminating radiation will be the predominant radiation and will vary in frequency.

Preferably there are a plurality of sources as a plurality of sources can be arranged to provide illumination from a variety of directions which will lead to a better image. However when using multiple sources it is preferable that each source emits the same frequency as the other sources at the same time in order to be able to collect frequency dependent data.

Preferably the or each source produces the same intensity at each illumination frequency. In other words an ideal illumination source will illuminate with a certain intensity at one frequency and will produce the same illuminating intensity at each other frequency in its operating range. Some sources can have intensity or power responses that vary with operating frequency.

A variation in illumination intensity with frequency will obviously lead to a variation in the intensity of detected radiation from the scene, whatever the material illuminated. Therefore, in order to identify effects which are purely frequency dependent it is preferable that any difference in illumination intensity can be accounted for.

Were only a single illumination source to be used any variation in illuminating power could be taken into account in signal processing of the output from the detector. However this is more difficult with multiple sources illuminating from different directions and so it is preferred to arrange for each source to have a constant power output across its operating range so that the total illuminating power is constant at each frequency where the output of the detector is recorded. In this way the illuminating power at a first frequency will be the same as that at a second frequency. Hence the intensity of radiation received from an object in the scene which does not exhibit any frequency dependent effects would be the same at both frequencies.

Where there are multiple sources the intensity of radiation from each individual source does not necessarily need to be the same as each other source used, it is sufficient that each source is itself constant across the frequency band. However it may be convenient to arrange for each source to illuminate with the same intensity as each other source to improve the final image otherwise parts of the subject would be illuminated more intensely than other parts of the subject.

The skilled person will appreciate that the sources will not produce a single frequency but rather will produce, at any given time, a signal with an instantaneous, relatively narrow bandwidth, and this narrow bandwidth is swept across the desired frequency range. The sources therefore preferably have an instantaneously bandwidth of approximately 2 GHz, or less than 2 Ghz. An instantaneous bandwidth of approximately 1 GHz may be appropriate. The skilled person will appreciate that the narrower the instantaneous bandwidth of the source the more likely the illumination source may cause speckle in the image and the apparatus will also exhibit a lower thermal sensitivity. However it is possible to average several acquired images together to reduce these effects. A benefit of averaging many images is that you get a single image with a wide effective bandwidth. This will then have better signal to noise and signal to speckle characteristics and may make detection of objects easier.

Looking for thin dielectric materials the expected refractive index range may be, for instance of the order of 1.5 to 2.2 with thicknesses in the range a few mm to a few cm. For such materials the interference effect fringe spacing is of the order of a few GHz so a very narrow instantaneous bandwidth is not required.

The frequency range over which the or each source is arranged to produce a variable output will depend upon the frequency of operation of the imager and the materials and expected sizes of the objects it is intended to image. The interference effect which leads to a frequency dependent response is dependent upon the thickness of the object to be imaged, its material properties and the frequency of operation. As will be understood the interference cycle is periodic and ideally the frequency of operation is swept across a range that will encompass at least one cycle. For an imager looking for a 9 mm slab of dielectric material of refractive index 1.6 the cycle period is approximately 10 GHz and so sweeping the source across at least a 10 GHz bandwidth is preferred. A smaller bandwidth could be used but obviously the full interference cycle would not be resolvable and so there is a lower chance of seeing maximum available contrast. A swept bandwidth of 5 GHz or more may be sufficient in some cases and as mentioned different materials will give different interference cycles.

Preferably the or each source comprises a variable frequency rf noise generator housed in a hollow, reflective panel having a plurality of apertures. Variable frequency rf noise generators with relatively narrow instantaneous bandwidths are known and are a simple way of producing microwave radiation. The rf noise generator is located in a hollow panel having a plurality of apertures therein so that the radiation reflects within the panel until exiting through an aperture. The apertures in the panel act as an array of point sources with good illumination characteristics and the random path lengths of the escaping reflected radiation destroys most spatial coherence thereby reducing speckle effects in the final image.

The detector preferably has a normalisation means for normalising the detected output at each different frequency.

As mentioned above with respect to the illumination sources it will be appreciated that the present invention is looking for frequency dependent variations in the detected radiation to identify the presence of dielectric materials. Preferably then, in the absence of a frequency dependent effect in the scene, the detected intensity of radiation at one frequency should be the same as the detected intensity at another frequency. Some detectors however have different responses, for instance response gain, at different frequencies and so would give rise to different outputs. The normalisation means corrects for any frequency dependent effects arising in the detector.

Where the detector comprises a detector array the normalisation means preferably applies a frequency dependent correction to each element of the detector array. Each individual detector element may exhibit a frequency dependent change in its gain which, if not corrected, would lead to discrepancies in images taken at different frequencies. The normalisation means therefore applies a frequency dependent correction to each detector element. The amount of correction needed, effectively a calibration factor, may be determined on manufacture by using the imager to image standard targets, for instance flat contrast free reflectors and/or absorbers at a plurality of different frequencies and measuring the output of each element in the array. Once determined in this way the known calibration factor may be applied to the output of each detector element at each frequency.

The detector normalisation means could be implemented in hardware, for instance a frequency dependent amplification/attenuation circuit, but conveniently the correction is made using signal processing and a suitable processor applies the appropriate calibration factor to the output of the detector or each element thereof for that frequency.

Preferably the detector is an imaging detector array. The imaging apparatus may comprise focusing optics together with a detector array such that each part of the detector array views a different part of the scene. The skilled person would be well aware of suitable detector arrays and focusing optics. Alternatively the detector may be an electronic-scan type imager. As the skilled person will be understand electronic-scan imagers tend to use a distributed array of receive channels and apply phase and/or time delays to provide a focussed image. Any type of detector arrangement which can form an image of the scene is appropriate.

Conveniently the indicator means comprises an image processor for analysing the output of the detector at different frequencies so as to detect any frequency dependent variations therein. As the only difference between the outputs at the different frequencies should be due to frequency dependent interference effects the presence of thin dielectric materials can be detected by automated processing techniques. The image processor effectively compares the outputs, for instance looking for significant variations in intensity within the normalised outputs and identifying areas of interest. These could be highlighted in a final image or an alarm signal could be used to inform an operator etc.

Preferably the apparatus comprises a display means for displaying an image derived from the normalised outputs of the detector array. An image can be displayed to the display means which will allow identification of metallic objects or other substantial objects in the same manner as for known millimeter wave imagers. However where the image is derived from the outputs acquired at several frequencies dielectric materials may be identified if present. For instance the indicator means could comprise means for rapidly displaying a plurality of images on the display means, each corresponding to an output taken at a different frequency. The presence of a dielectric material leading to an interference effect will lead to a change in intensity in the different images which would appear as a characteristic flashing in a rapidly displayed succession of images whereas metallic objects or the human body would have substantially the same intensity in the normalised images. Alternatively at least some of the outputs acquired at different frequencies could be averaged together to form an image in which any dielectric material will contrast against its background material.

In another embodiment the frequency selection means may comprise at least one filter to filter the radiation received by the detector. Thus the detector could receive a filtered signal which is limited in frequency bandwidth to provide the different predominant frequencies. A filtered detector arrangement could be used in addition to variable illumination sources or as an alternative thereto. For instance a single broadband illumination source could be used to illuminate the scene and the filter arrangement provides the different frequencies. When a broadband source is used it is preferably a source with a flat output power, i.e. the same intensity at all frequencies within the detection range. This eases the identification of frequency dependent variations in different outputs in the same way as described above with regard to variable sources.

In some situations an active illumination source may not be required at all, the ambient lighting conditions of the scene may be sufficient to provide a reasonably flat broadband illumination. For instance when imaging outdoors the sky can provide a reasonably flat illumination.

Conveniently the filter is a variable bandpass filter and the frequency selection means controls the passband of the filter so as to periodically alter the frequency of detected radiation. In this way a number of different frequencies are detected over time. Alternatively the arrangement may be such that the received radiation is split into several channels and each subjected to a different frequency bandpass filter prior to detection. Such an arrangement would allow fixed filters to be used and would allow simultaneous imaging of the different frequencies. However for most applications the frequency can be varied quickly enough to allow several different frequencies to be recorded in succession and the need for several different filters and detector channels can be avoided.

In a second aspect of the invention there is provided a millimeter wave imaging apparatus comprising at least one illumination source and an imaging detector characterised in that the or each source is adapted to illuminate the scene sequentially with a plurality of different illuminating frequencies at substantially the same intensity and the apparatus is adapted to record the output of the detector at a plurality of different illuminating frequencies.

Thus the apparatus according to the second aspect of the invention has at least one source which is adapted to sequentially illuminate the scene with radiation of a plurality of different frequencies. The source is adapted to have an output which has same intensity at each different frequency. The output of the detector array therefore records the radiation from the scene where the intensity level of illumination is the same but the frequency of illuminating radiation varies allowing frequency dependent effects to be identified. As with the first aspect of the invention this allows the discrimination of relatively transmissive items, such as relatively thin slabs of dielectric material.

In a third aspect of the invention there is provided a millimeter wave imaging apparatus comprising at least one illumination source and an imaging detector characterised in that the or each source is adapted to illuminate the scene sequentially with a plurality of different illuminating frequencies and record the output of the detector at a plurality of different illuminating frequencies further comprising a normalising means for normalising the detector output at each different illuminating frequency.

In the third aspect of the invention the illumination source illuminates the scene sequentially with a plurality of different frequencies which are recorded by the imaging detector. In this aspect of the invention a normalising means normalises the output of the detector at each frequency.

All of the advantages and embodiments of the first aspect of the invention are equally applicable to the second and third aspects of the invention. In particular the millimeter imager of the second aspect of the invention may have a normalisation means for normalising the output of the detector array at different frequencies, for instance to correct for frequency dependent gain effects of the elements of the detector array.

In a further aspect of the invention there is provided a method of screening an object for a concealed item comprising the steps of; arranging a millimeter wave imaging detector relative to an object to be screened so as to be able to form an image of at least part of the object, recording the output from the detector at a variety of different predominant frequencies and analysing the outputs of the detector for any frequency dependent variation from the object.

The method according to the present invention therefore records the detected radiation from a scene at a plurality of different predominant frequencies. The different outputs are then analysed to detect any frequency dependent effects in the outputs. As mentioned above the output taken at any one of the predominant frequencies will allow an image to be formed which may allow the identification of concealed items. However by analysing the outputs taken at several frequencies any frequency dependent variation in the scene can be identified which can reveal concealed items which otherwise could not be discriminated.

Preferably, to aid identification of the frequency dependent variations in the scene, the method includes the step of calibrating the outputs of the detector array to account for any frequency dependent response of the imaging apparatus, such as frequency dependent gain effects of each detector element. Removing any frequency dependent response of the imaging apparatus means that frequency dependent variations in the scene are more apparent.

Preferably the method also involves the step of sequentially illuminating the scene with a plurality of different illumination frequencies. Illuminating the scene with different illumination frequencies is easily achievable and allows an image of the scene to be recorded with different frequency components, allowing identification of frequency dependent effects. Conveniently the scene is illuminated with a succession of different frequencies at the same intensity. Ensuring that each illuminating frequency is at the same intensity as each other illuminating intensity again makes frequency dependent variations in the scene, such as due to the presence of relatively thin dielectric materials, easier to discern as materials not exhibiting any frequency dependent effects should not show any variation in the recorded outputs.

Conveniently the step of illuminating the scene with a succession of different frequencies involves illuminating the scene with a frequency bandwidth of less than 2 GHz. The succession of different frequencies may be within a bandwidth of at least 5 GHz, or at least 10 GHz.

The step of analysing the outputs of the detector array for any frequency dependent variation in the scene may be performed in a variety of ways. One simple way is to average some or all of the outputs to form an average image to be displayed to a user. The interference effects of any dielectric material presence will have altered the overall intensity received from that part of the scene across the various images. Therefore any such material which is not readily identifiable in a single image should be noticeable in the final image. Averaging is a simple way of analysing the outputs but it may not give as great a contrast as is available by comparing the individual images at different frequencies.

Where it is wished to compare the outputs and the outputs have not been calibrated prior to being recorded the first stage may be a calibration step as described above to remove any frequency dependent effects of the imaging apparatus. The result of such a calibration step is effectively a series of normalised images of the scene taken at different frequencies. These can be analysed using signal processing techniques to identify areas of changing contrast which could be highlighted to an operator, for instance two images showing the greatest contrast difference could be shown side by side or one image could be subtracted from the other to highlight the area of interest which could then be overlaid on a single image. Alternatively some or all of the images could be displayed in rapid succession and any frequency dependent variation in the scene would result in an apparent flashing effect as the different images are displayed.

Preferably therefore the step of analysing the outputs includes displaying an image derived from the outputs to an operator.

Alternatively the signals could be automatically processed for regions that vary from one image to the next to identify frequency dependent variations and if detected an alarm could be activated, for instance an audible alarm and/or flashing lights etc. This could be additional to a display means to draw an operators attention or could be used as an alternative.

In a yet further aspect of the invention a method of screening an object for a concealed item is provided comprising the steps of; arranging a millimeter wave imaging detector array relative to an object to be screened so as to be able to form an image of at least part of the object, successively illuminating the object with millimeter wave radiation at a plurality of different frequencies, recording the output from the detector array at each frequency and analysing the outputs of the detector array for any frequency dependent variation in the scene.

The methods and apparatuses of the various aspects of the present invention therefore offer an improved imaging apparatus and method that allows detection of concealed objects that are largely transmissive, especially plastic like dielectric materials, and so may be difficult to detect in a single image taken at one frequency or when illuminated with a broadband source. In essence some aspects of the invention relate to an imaging apparatus having at least one source having a narrow band variable frequency and an imaging detector array adapted to image a scene and record the output at a plurality of different illuminating frequencies.

BRIEF DESCRIPTION OF THE DRAWINGS

The invention will now be described by way of example only with reference to the following drawings of which.

DETAILED DISCUSSION OF EMBODIMENTS

Figure 1:
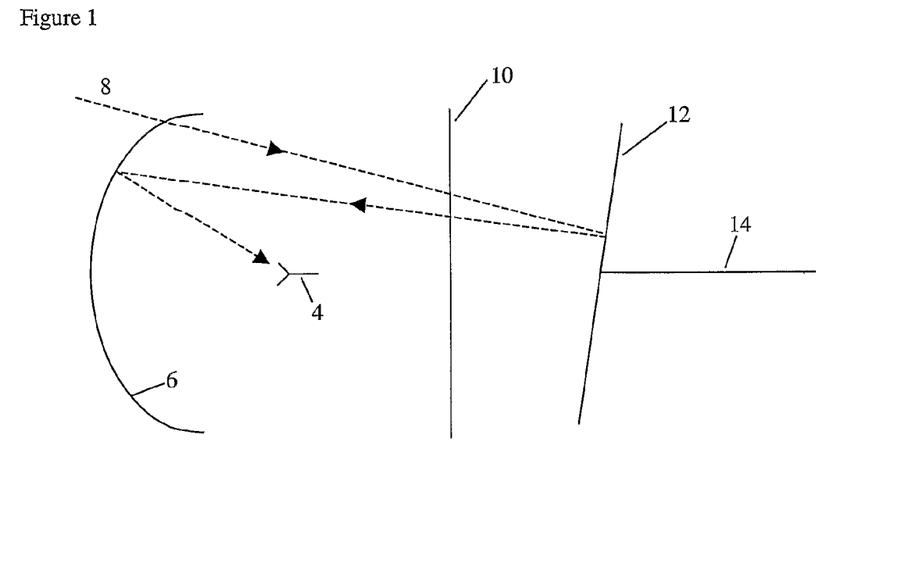
FIG. 1 shows a millimeter wave imaging system suitable for use in the present invention.

FIG. 1 shows a millimeter wave imaging system such as is described in WO00/14587 suitable for use in the present invention. The imaging system, generally indicated 2, comprises an imaging detector array 4 disposed to receive radiation focused by curved polarising grid 6. The detector array is preferably formed by an array of Gallium Arsenide microwave monolithic integrated circuits (MMICs) comprising a receiver and amplifier circuit. GaAs MMICs are preferred as they offer good receive and amplification characteristics for the frequency range of interest but other detector elements could be used and the invention is applicable to any millimeter wave imaging array.

Radiation from the scene 8 is incident on curved polarising grid 6. Polarising grid 6 is a polarisation sensitive reflector and so only passes radiation having a particular polarisation whilst reflecting radiation of the orthogonal polarisation. Imagine that the polarising grid 6 is arranged so that it transmits vertically linearly polarised radiation. To such radiation the grid is effectively transmissive and therefore it passes through the grid 6 unaffected before encountering quarter wave plate 10. As will be well understood linearly polarised radiation passing through a quarter wave plate is converted to circularly polarised radiation of a particular handedness (if the QWP is correctly oriented wrt the polarisation of the incident radiation), for instance vertically linearly polarised radiation may be converted to right handed circularly polarised radiation.

The radiation is then incident on scanning mirror 12. Scanning mirror 12 is mounted for rotation about an axis 14 but is mounted so as to lie in a plane which is not orthogonal to this axis. In use the mirror 12 is rotated on its axis so that the look direction of the system changes and the detector array 4 images different parts of the scene.

As will be understood by the skilled person reflection of circularly polarised radiation reverses the handedness thereof and so, after reflection, right handed circularly polarised radiation will be left handed circularly polarised. When it then passes back through quarter wave plate 10 it will be converted to back to linearly polarised radiation, but, as the handedness of the circularly polarised radiation has swapped the plane of polarisation of the linearly polarised radiation will be orthogonal to the one in which it was originally polarised, i.e. it will be converted to horizontally polarised radiation.

When this horizontally polarised radiation is incident on curved polarising grid 6 it is this time reflected by the grid which acts as a curved reflector and so focuses the radiation onto detector array 4.

This arrangement allows a compact scanning millimeter wave imaging system to be implemented which is useful in certain applications such as personnel screening. However the invention is applicable to any millimeter wave imaging system and is not limited to this type of imager. In particular the invention could be used with an electronic-scan type of imager where the detector comprises a plurality of receiver channels spread over a relatively wide area and omits the needs for focusing optics such as curved polarising reflector 6. Phase and/or time delays are applied to the outputs from each receive channel to provide directional focusing and the delays can be altered to provide scanning. In such an arrangement each receiver element sees a large amount of the scene and the outputs are combined to form a sharp image.

Figure 2:
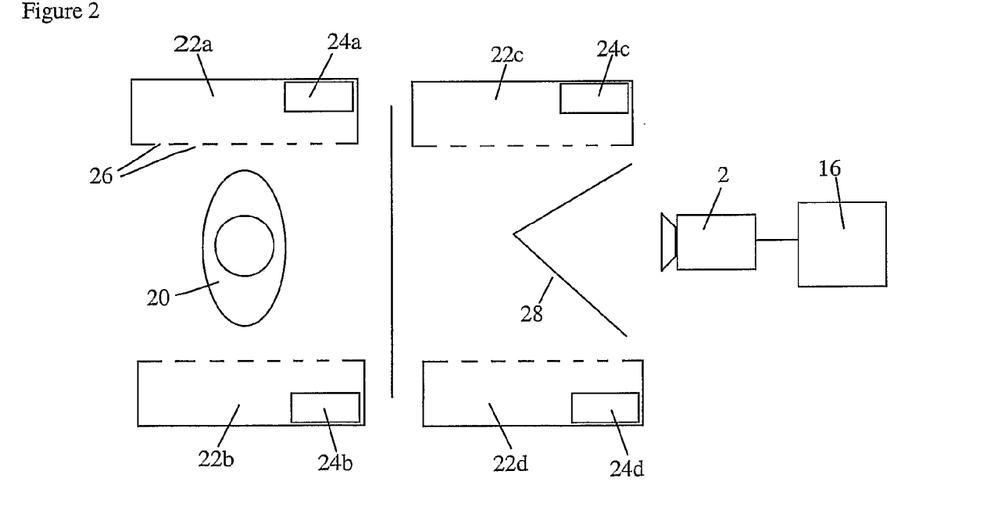
FIG. 2 shows a possible arrangement of imaging system and illumination sources.

FIG. 2 shows an arrangement of illumination sources and a millimeter wave imaging system that could be used for personnel scanning.

A millimeter wave imaging system 2, which could be that described with reference to FIG. 1, is disposed so as to scan an area where a person to be screened 20 will stand. The imaging system 2 is connected to a display 16 which may be viewed by an operator. To illuminate the subject four illumination panels 22a-d are disposed around the person.

Each panel 22a-d comprises an rf noise source 24a-d disposed in a hollow panel provided with a plurality of apertures therein 26 on one side. The inside of the panel is reflective so that radiation emitted by the rf noise source is reflected within the panel until exiting through one of the apertures 26. The plurality of apertures acts as an array of point sources illuminating the scene giving rise to good illumination. However because of the varying path lengths radiation exiting the panel the radiation has low spatial coherence and so leads to minimal problems with glint or speckle in the image. Having a single rf noise source in each panel is a simple and cost effective way of providing controllable illumination.

Illumination panels 22a and 22b are arranged on either side of the imaging area where a person 20 will be located during imaging. To provide illumination for the front of the person without blocking the line of sight of the imaging system 2 illuminating panels 22c and 22d are located either side of a polarisation sensitive reflector 28. Polarisation sensitive reflector 28 acts in the same fashion as polarising grid 6 described above in that it transmits radiation of one polarisation and reflects radiation of the orthogonal polarisation. Thus any horizontally linearly polarised radiation emitted from illumination panels 22c and 22d will be reflected towards the scene. Quarter wave plate 30 acts in the same fashion as the quarter wave plate 10 described above and acts to change the polarisation state of radiation transmitted to and reflected from the scene to vertically polarised radiation which will then pass through polarisation sensitive reflector 28 to the imaging system 2.

Note the exact polarisation states given above are illustrative only and other schemes could be used. However when the illumination system of FIG. 2 is used in conjunction with the imaging system of FIG. 1 obviously radiation passed by the polarisation sensitive reflector 28 should be of the same type as will be transmitted by the curved polarising grid 6.

A millimeter wave imager as described with reference to FIGS. 1 and 2 above collects radiation from the scene and produces an image based upon the intensity of radiation received. The radiation received from any particular object within the scene will depend upon the radiation emitted by the object, which is function of temperature of the object, the radiation transmitted by the object and the radiation reflected from the object.

The human body has a co-efficient of reflectivity of approximately 0.5 whereas metallic objects have a co-efficient of reflectivity approaching 1.0. Thus when illuminated by an illumination scheme such as described in FIG. 2 the human body will reflect approximately half the incident radiation whereas metallic objects will reflect most of the incident radiation. Insubstantial items such as clothing are largely transmissive at millimeter wavelengths. Thus when a person is screened a medium intensity image of the body will be formed against a low level background with any metallic objects being identifiable as areas of high intensity. Substantial non metallic objects such as ceramics may also be identified as they will have different reflectivity and emissivity characteristic to the human body.

Certain dielectric materials however, with thicknesses of the order of millimeters or centimeters can have relatively high transmissivity, of the order of 90%. The high transmission co-efficient makes them particularly difficult to detect using a standard millimeter wave imager. In effect they are virtually invisible to the imager. This group of materials can include plastics explosives or certain controlled substances and so there is an obvious desire to be able to detect such items. The present invention makes use of the realisation that when placed in close proximity to a more substantial item, such as the human body, such items can act as an antireflection coating to the item. This can render the dielectric material visible to the user of the imaging system. The material could be detectable as a layer on its own, i.e. not in the vicinity of another body, but in applications directed towards identification of concealed objects it will generally be located near, but not necessarily touching, another object.

The antireflection effect is an interference effect and as such is a function of frequency, viewing angle, the sample thickness and the properties of the sample and the sample surface. In simple terms at certain frequencies the path length difference in radiation reflected from the front surface of the dielectric compared to radiation reflected from the dielectric-body interface may result in destructive interference, reducing the apparent reflectivity of the body. At other wavelengths however there may be no significant effect and the presence of the dielectric material would not be noticeable. Therefore the system is designed to sweep the illumination source across a frequency range so as to maximise the chance of detecting the interference effect of any dielectric material.

Prior art millimeter wave detection systems have previously had trouble identifying relatively thin dielectric slabs such as explosives materials. U.S. Pat. No. 5,073,782 and U.S. Pat. No. 5,227,800 both suggest that plastic explosive can be identified by millimeter wave imagers by looking at stress lines in the image—however it may be reasonably difficult to detect such stress lines and a clear image of plastics explosives is not produced.

Figure 3:
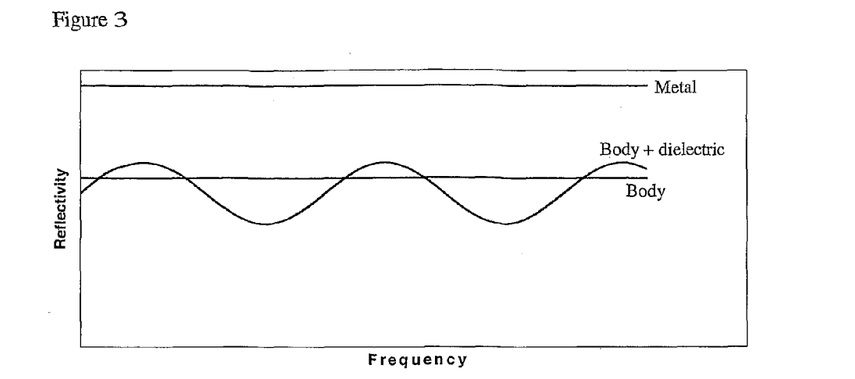
FIG. 3 shows an idealised plot of reflectivity against frequency for metallic objects, the human body and the human body with a thin dielectric material in front.

This principle of the present invention is illustrated with respect to FIG. 3 which shows idealised graph of reflectivity against frequency for different materials assuming a constant power of illumination and a constant gain of detection. Metals tend to have a high reflectivity which is constant across the frequency range as shown by line 32. Similarly the human body has a reflectivity 34 with frequency in the millimeter waveband which is significantly lower than that for metals and is generally constant over a reasonably wide range such as 10 GHz or more. However as mentioned when a thin slab of dielectric material is place in front of the body interference effects occur and so the apparent reflectivity of the dielectric body combination 36 varies as a function of frequency.

Figure 4A:
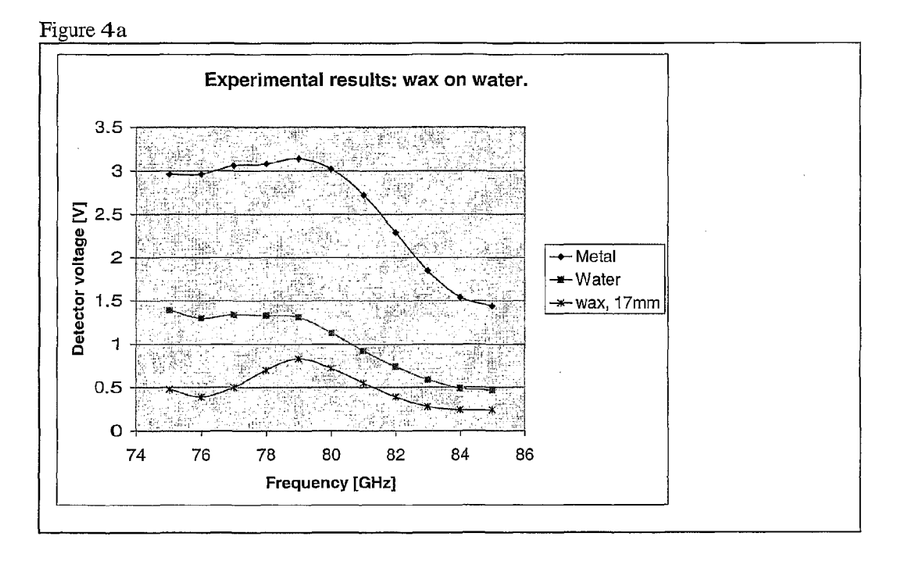
FIG. 4a shows the results of an experiment looking at the detector output against frequency for metal, water and water and wax together
Figure 4B:
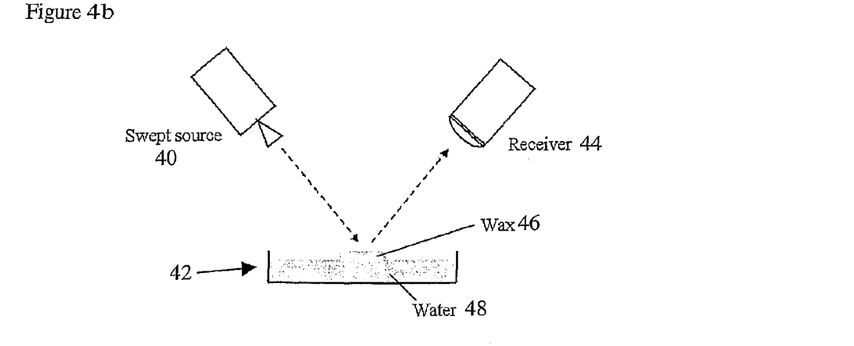
FIG. 4b shows the experimental set up.

FIG. 4a shows the actual results obtained looking at the frequency dependent response of metal, water and water plus a dielectric material. The experimental set-up is illustrated in FIG. 4b. A source 40 was arranged to illuminate an object 42 and a receiver 44 arranged to detect the radiation reflected. The receiver output was plotted as a function of frequency. The system was first used to image a metal calibration target (not shown) at the range of frequencies. Next the metal was replaced with water—which is a reasonable substitute for the human body—and the experiment repeated. Finally a 17 mm thick slab of wax 46 floated on the surface of the water 48 and the water-wax combination imaged. The source 40 had an instantaneously bandwidth of approximately 1 GHz and was swept in ten 1 GHz intervals from 75 GHz to 85 GHz. The results are shown in FIG. 4a.

It can be seen that the metal 50 has a higher reflectivity than the water 52. It can also be seen that the presence of the wax on the water 54 alters both the level of reflection and the shape of the reflectivity curve. Interference processes have caused a reflectivity null around 76 GHz and the wax shows up with high contrast at this frequency.

It can seen though that the system response in this experiment is not flat. For instance the reflectivity of the metal 50 is not largely flat as indicated in the idealised FIG. 3. There are two possible reasons for this. First the intensity output of the source 40 may be frequency dependent and it may have a greater intensity at lower frequencies.

Second the gain of the receiver elements will have a frequency dependent response. It can be seen that the shape of the curve 50 for the metal reflectivity is substantially the same as that 52 for water.

It is therefore possible to normalise the images from an imaging detector array by calibrating out these effects. For instance showing the system known reflectivity standards, for instance metal and absorber, would allow calibration of subsequent measurements from a voltage plot to a reflectivity plot.

Where there is only one source any variations in illuminating power could be measured and, if constant, could be calibrated out in signal processing of the detected signal. However where there are multiple sources the calibration becomes harder and a better image is obtained by ensuring that illumination from the sources is constant across the frequency range. Therefore the rf sources shown in FIG. 2 could, for instance, all comprise an attenuator and a feedback loop to ensure a constant output across the frequency range. Obviously all the sources should also emit the substantially the same frequency at the same time. The sources shown in FIG. 2 are therefore all linked to a controller (not shown). In use the controller will activate all the sources and ensure that they are swept at the same time so as to ensure illumination with the same narrow instantaneous bandwidth from each source. The controller may also set the intensity level which each source operates at.

Calibration of the frequency dependent gain of the receiver elements is most easily achieved using signal processing techniques based on known gain characteristics of each receiver element that can be measured initially using known standards as mentioned. This may be performed by an imager processor which is linked to the source controller so it monitors the frequency at which each image is acquired and applies the appropriate calibration factor.

As illustrated with respect to FIG. 3 the interference effect is periodic. The cycle period depends upon the apparent thickness of the dielectric material. The thinner the slab of dielectric, the wider the fringe spacing associated with the antireflection effect. Ideally the bandwidth swept by the illumination panels 22a-d should be wide enough to allow capture of an entire interference cycle for a particular thickness of dielectric. For example the cycle period for a 9 mm slab of dielectric material with a refractive index of 1.6 is approximately 10 GHz. Thus sweeping the illumination panels 22a-d across a 10 GHz bandwidth would be preferred in order to maximise the chances of detecting both a reflectance maximum and minimum from that 9 mm slab, producing a large contrast. The interference effects due to thinner samples can still be detected in a 10 GHz sweep but the greatest contrast difference between the reflectivity maximum and minimum may not be present.

The exact operating conditions will therefore vary depending upon the situation in which the imager is being used and what material it is wished to detect. However the skilled person would be well aware of how to determine an appropriate band of operation for a particular circumstance. Obviously however the detector elements need to be able to operate at all frequencies of operation, as indeed all other components of the system—for instance the polarisation sensitive reflectors etc.

Similarly the frequency of operation will be chosen according to the particular application. The above analysis has generally assumed that the dielectric is in contact with the adjacent object such as the body. However in reality there may be a gap between the dielectric and the body, either air or clothing which will make the reflectivity response more complicated. Additionally variation in the dielectric thickness, composition or distance from the body will produce different interference conditions. For this reason it is desirable to focus on instantaneously small areas to maximise chances of the measurement being of a single interference condition and so relatively high resolution detection is preferred. However even if the resolution is such that different interference effects may contribute to an individual reading, for instance the spot resolution covers an area where the thickness of the material shows a significant change, it will be possible to identify some interference effects. Whilst the reflectivity curve would not be as clearly distinguishable it is likely that the reflectivity profile of body plus dielectric will still vary from that of the body alone.

A frequency of operation centred around 80-85 GHz is achievable and gives good resolution images. The frequency of operation may be centred around a frequency within the range 55 GHz to 110 GHz. However any mmw system (i.e. operating from 20 to 300 GHz or even higher) will benefit from this approach.

The number of samples taken during the frequency sweep is also of importance. To ensure that all available information is recorded it is desirable to collect data at centre frequencies that are separated by at most half the instantaneous bandwidth of the measurement. Thus if the instantaneous bandwidth were 2 GHz measurements made at 1 GHz intervals across the swept bandwidth would be appropriate.

Thus referring back to FIGS. 1 and 2 a person 20 stands in the position indicated and the sources 24a-d swept as indicated to sequentially illuminate the person 20 at a plurality of different frequencies. At each frequency the imager 2 performs a scan of the subject and records the output. Thus a whole image is acquired at each frequency. An alternative approach which is equally valid is to very rapidly sweep the frequency whilst the imager is looking at one pixel. Thus the images are taken effectively simultaneously rather than one image at frequency f1, then one at f2 and so on. Where a scanning array is used this means that multiple samples at different frequencies are taken at each scan point so the sampling rate and frequency sweep rate is relatively high but this is achievable and allows real time imaging.

After sweeping the frequency of measurement across the bandwidth a number of different images will have been acquired. Referring to the example used earlier a 10 Ghz sweep taking images at every 1 GHz will lead to 10 different images. Any metallic or other substantial images should be clearly identifiable in any of these images as normal for a millimeter wave imaging system. However comparison of these images can reveal the presence of dielectric materials which may not show up in at least some of the individual images.

The different images can be used in various ways. All the images could be averaged together and the resulting normalised average image displayed on display 16 to an operator. This would have the advantage of reducing the impact of some forms of noise and clutter on the imagery but will not give the greatest contrast between any dielectric material present and the body.

Alternatively after each individual image has been normalised to take account of frequency dependent gain effects etc. the images may be rapidly displayed a display 16. If the normalisation process has been properly achieved the only significant difference between the images will be the presence of any dielectric material. The varying response in the different images acquired at different frequencies will lead to a flashing effect when the images are displayed rapidly which could be a clear indication of the presence of a dielectric material.

An intermediate image could be formed from the reflectivity maximum for each pixel in the scene and another from the reflectivity minimum for each pixel. Subtraction of these images from one another should leave a static image which is blank apart from any dielectric material which is present in the scene.

Image processing techniques could be readily applied to the normalised images in order to automatically detect any difference in contrast between the various images acquired and indicate to an operator accordingly, for instance by activating an alarm, or highlight the part of the image of interest. Thus the technique of the present invention could be used in conjunction with automated target recognition software.

The invention has principally been described with reference to personnel screening. However the invention is applicable to a range of screening applications from screening luggage and packages to vehicle screening etc and extends the capability of millimeter wave images to be able to discriminate thin dielectric materials.

The invention claimed is:

1. A millimeter wave imaging apparatus comprising:
   at least one detector arranged to produce a plurality of images of a scene;
   a frequency selector providing a plurality of different predominant frequencies of radiation for detection wherein each of said plurality of images corresponds to said different predominant frequency;
   an image processor for processing the plurality of images by detecting changes in intensity occurring in corresponding objects across the plurality of images;
   an indicator for indicating the presence of any frequency dependent changes in intensity detected by said image processor, and
   means for normalizing at least one of an output of the detector and an associated illuminator at each of the plurality of different frequencies.

2. A millimeter wave imaging apparatus as claimed in claim 1 further comprising at least one illumination source having a variable output frequency wherein the frequency selector periodically varies the output of the or each illumination source.

3. A millimeter wave imaging apparatus as claimed in claim 2 comprising a plurality of illumination sources, the frequency selector being arranged such that each illumination source emits the same frequency at the same time.

4. A millimeter wave imaging apparatus as claimed in claim 2 wherein the or each illumination source is adapted such that it produces the same intensity at each illumination frequency within the operating band.

5. A millimeter wave imaging apparatus as claimed in claim 2 wherein the or each illumination source has an instantaneous bandwidth of approximately 2 Ghz or less.

6. A millimeter wave imaging apparatus as claimed in claim 2 wherein the or each illumination source has an output frequency which varies by 5 GHz or more or 10 GHz or more.

7. A millimeter wave imaging apparatus as claimed in claim 2 wherein the or each illumination source comprises a variable frequency rf noise generator housed in a hollow, reflective panel having a plurality of apertures therein.

8. A millimeter wave imaging apparatus as claimed in claim 1 wherein the detector comprises a detector array and the normalization means applies a frequency dependent correction to the output of each detector element in the imaging detector array.

9. A millimeter wave imaging apparatus as claimed in claim 8 wherein the normalization means comprises a processor adapted to process the output of the detector to apply the frequency dependent correction.

10. A millimeter wave imaging apparatus as claimed in claim 1 wherein the indicator comprises an image processor for analysing the detector output at different frequencies so as to detect any frequency dependent variations therein.

11. A millimeter wave imaging apparatus as claimed in claim 1 wherein the apparatus comprises a display arranged to display an image derived from the outputs of the detector.

12. A millimeter wave imaging apparatus as claimed in claim 1 wherein the frequency selector comprises at least one filter acting on the detector.

13. A millimeter wave imaging apparatus as claimed in claim 12 wherein the filter is a variable filter and the frequency selector controls the passband of the filter.

14. A millimeter wave imaging apparatus as claimed in claim 12 wherein the frequency selector comprises a plurality of different filter elements arranged in parallel such that a plurality of different frequencies are detected simultaneously.

15. A method of screening an object for a concealed item comprising the steps of:
arranging a millimeter wave imaging detector relative to an object to be screened so as to be able to form a plurality of images of at least part of the object on said detector, wherein each of said images corresponds to a different predominant frequency and produces an output;
determining a detector calibration factor at each of said different predominant frequencies;
applying said calibration factor to said detector outputs at respective different predominant frequencies so as to normalize said detector outputs;
detecting changes in intensity occurring in the object across said plurality of images; and
analysing the images for any frequency dependent variation from the object.

16. A method as claimed in claim 15 wherein the method further comprises the step of calibrating the outputs of the detector to account for any frequency dependent response of the imaging apparatus.

17. A method as claimed in claim 15 wherein the method further comprises the step of successively illuminating the object with millimeter wave radiation at a plurality of different frequencies and the output from the detector is recorded at each illuminating frequency.

18. A method as claimed in claim 17 wherein the step of illuminating the object comprises illuminating the object with a succession of different frequencies at the same intensity.

19. A method as of claim 15 wherein the step of analysing the outputs of the detector recorded at different frequencies includes the step of displaying an image derived from the outputs to an operator.

20. A method as claimed in claim 15 wherein the step of analysing the outputs of the detector recorded at different frequencies includes the step of automatically processing the outputs to detect any frequency dependent variation and triggering an alarm when a frequency dependent variation is identified.

21. A method as claimed in claim 15 wherein the method includes the step of filtering the detector.

22. A method of screening an object for a concealed item comprising the steps of:
arranging a millimeter wave imaging detector array relative to an object to be screened so as to be able to form a plurality of images of at least part of the object;
successively illuminating the object with millimeter wave radiation from an illuminator at a plurality of different frequencies;
recording the output images from the detector array at each frequency;
analyzing the outputs of the detector array for any frequency dependent variation in the scene,
normalizing one of an output of the detector and the illuminator at each of the plurality of different frequencies; and
indicating the presence of any frequency dependent changes in intensity detected.

* * * * *